US012800428B2

(12) United States Patent
Weber et al.

(10) Patent No.: US 12,800,428 B2
(45) Date of Patent: Nov. 17, 2026

(54) MEASUREMENT APPARATUS FOR DETERMINING A BENDING MOMENT

(71) Applicants: AIRBUS HELICOPTERS DEUTSCHLAND GMBH, Donauwörth (DE); AIRBUS HELICOPTERS, Marignane Cedex (FR)

(72) Inventors: Simone Weber, Munich (DE); Raphael Rammer, Munich (DE); Wolfgang Wagner, Inning Am Holz (DE); Maxime Asselin, Marseilles (FR); Markus Walter, Oberndorf Am Lech (DE)

(73) Assignees: AIRBUS HELICOPTERS DEUTSCHLAND GMBH (DE); AIRBUS HELICOPTERS (FR)

( * ) Notice: Subject to any disclaimer, the term of this patent is extended or adjusted under 35 U.S.C. 154(b) by 198 days.

(21) Appl. No.: 18/773,651

(22) Filed: Jul. 16, 2024

(65) Prior Publication Data

US 2025/0155315 A1 May 15, 2025

(30) Foreign Application Priority Data

Nov. 14, 2023 (EP) .................................... 23315420

(51) Int. Cl.

| | |
|---|---|
| ***G01M 5/00*** | (2006.01) |
| ***G01D 5/353*** | (2006.01) |
| ***G08B 21/18*** | (2006.01) |

(52) U.S. Cl.

CPC ...... *G01M 5/0016* (2013.01); *G01D 5/35316* (2013.01); *G01M 5/0041* (2013.01); *G01M 5/0091* (2013.01); *G08B 21/182* (2013.01)

(58) Field of Classification Search

CPC G02B 6/29359; G02B 27/00; G02B 27/0018; G02B 27/0025; G02B 27/0037; G01J 3/26; G01J 3/42

See application file for complete search history.

(56) References Cited

U.S. PATENT DOCUMENTS

2007/0294049 A1* 12/2007 Pierce .................. F03D 7/0296 73/455
2009/0324409 A1* 12/2009 Volanthen .............. G01L 1/246 416/61

(Continued)

FOREIGN PATENT DOCUMENTS

DE 102009021557 A1 11/2010
EP 1317663 A1 6/2003

(Continued)

OTHER PUBLICATIONS

European Search Report for European Application No. EP23315420.2, Completed by the European Patent Office, Dated Mar. 18, 2024, 8 pages.

*Primary Examiner* — Dominic J Bologna
(74) *Attorney, Agent, or Firm* — Brooks Kushman P.C.

(57) ABSTRACT

A measurement apparatus for determining a bending moment acting on a rotor shaft of a rotary-wing aircraft as well as to a method of operating such a measurement apparatus. The measurement apparatus includes a processing system and a sensor arrangement that is mounted to a rotor blade which is attached to the rotor shaft. The sensor arrangement includes a sensor that generates a signal in response to a force or moment acting on the rotor blade. A cable transmits the signal from the sensor to the processing system, and the processing system determines the bending moment acting on the rotor shaft based on the signal from the sensor.

20 Claims, 10 Drawing Sheets

(56) References Cited

U.S. PATENT DOCUMENTS

| | | | | |
|---|---|---|---|---|
| 2010/0114504 | A1 | 5/2010 | Doleschel et al. | |
| 2013/0294911 | A1* | 11/2013 | Egedal | F03D 7/043 416/1 |
| 2015/0370030 | A1* | 12/2015 | Sutton | B64C 27/33 156/196 |
| 2020/0132052 | A1* | 4/2020 | Schmid | F03D 17/00 |
| 2022/0065738 | A1* | 3/2022 | Wurzel | B64C 27/06 |
| 2023/0194312 | A1* | 6/2023 | Cravener | G01D 5/16 324/207.21 |

FOREIGN PATENT DOCUMENTS

| | | | |
|---|---|---|---|
| EP | 2104843 | A2 | 9/2009 |
| EP | 2182337 | A2 | 5/2010 |
| EP | 3961177 | B1 | 6/2022 |
| JP | 2004333378 | A | 11/2004 |
| RU | 2013135204 | A | 2/2015 |
| WO | 2008088326 | A2 | 7/2008 |

* cited by examiner

MEASUREMENT APPARATUS FOR DETERMINING A BENDING MOMENT

CROSS-REFERENCE TO RELATED APPLICATIONS

This application claims priority to European patent application No. EP 23315420.2 filed on Nov. 14, 2023, the disclosure of which is incorporated in its entirety by reference herein.

TECHNICAL FIELD

The present technology relates to a measurement apparatus for determining a bending moment acting on a rotor shaft of a rotary-wing aircraft in a current state compared to an initial undeformed state. The present technology also relates to a method of operating such a measurement apparatus.

BACKGROUND

Rotor shafts that rotate around a rotational height axis (i.e., the axis that is perpendicular to the circular basis of the rotor shaft) are usually supported or fixed at one end and free at the other end. The rotating blades that are mounted to the free end induce various loads into the rotor shaft, including bending moments.

For example, in an unarticulated construction of a rotor head, the rotation of rotor blades can deliver high bending moments into the rotor shaft. Overly high bending moments can lead to a premature fatigue of the rotor shaft or a damage of transmission parts. Therefore, a pilot may be required to monitor the bending moment acting on the rotor shaft in operation. For this purpose, the bending moment or a portion of the maximum allowable bending moment is usually displayed in the cockpit of a rotorcraft. Exceeding fixed boundary values in operation often leads to maintenance operations and should be avoided.

Conventionally, the bending moment in a rotor shaft is measured through strain measurements with strain gauges. These strain gauges are usually bonded, soldered, and/or cemented in the upper part of the rotor shaft. However, in operation, the strain gauges and the connection inside the rotor shaft are exposed to dynamic loads and fluctuating ambient conditions (e.g., temperature, vibrations, and moisture) and thus are highly stressed.

Since, the strain gauges are mainly installed inside the rotor shaft using complex bonding, soldering, and/or cementing processes, maintenance and repair of these strain gauges often require the complete disassembly of the rotor system and a deinstallation of the rotor shaft using special tooling, which is very costly and time-consuming, leading to long ground times for the associated rotorcraft.

The document EP 2 182 337 A2 describes a method and a device for contactless determination of forces and/or moments acting on a hollow cylindrical body, in which via a light source, light radiation is produced within the hollow cylindrical body; measurement signals are recorded by an optoelectronic sensor; the measurement signals recorded by the optoelectronic sensor are supplied to the signal processing unit; the signal processing unit detects and outputs changes of the measurement signals relative to an initial state determined beforehand by calibration, corresponding to the initial undeformed state of the hollow cylindrical body; and when a mechanical deformation of the hollow cylindrical body is present, according to a calibration function or a calculation rule, the signal processing unit outputs an output signal that describes the forces and/or moments that are causing the mechanical deformation of the hollow cylindrical body.

The document DE 10 2009 021 557 A1 describes a method that involves utilizing a camera-based optical measurement system, and receiving reference patterns by the measurement system. Images recorded by the measurement system are processed and/or evaluated, such that linear momentum is determined from an idle position of the reference patterns and/or a position of the reference patterns in a camera image during deformation of a shaft. The reference patterns are arranged at center of the shaft such that centers of the reference patterns rest on rotational axes of a rotatable shaft. The document also describes a shaft inspection- and/or monitoring device for inspecting and/or monitoring movement of a rotatable shaft.

Both of the above documents describe solutions that incur high costs for specialty measurement equipment including cost for sophisticated sensors, signal transmission and signal processing electronics, sensor installation, etc. Moreover, the respective shafts often operate in harsh environments with significant vibration loads, variation in temperatures and moisture, and the presence of oil, etc., which may adversely affect the reliability of the associated measurement apparatus.

The document EP 2 104 843 A2 describes a Hall effect helicopter mast torque meter that includes a stand pipe, a first magnet, a second magnet, and a sensor. The stand pipe is connected to the top of the mast such that the stand pipe rotates at the same velocity as the mast. The first magnet is operably associated with the stand pipe which is operably associated with the top of the mast. The second magnet is operably associated with the bottom of the mast. The sensor detects the magnetic field of the first magnet and the second magnet.

However, the described mast torque meter measures a differential torsion to determine a torque moment. Furthermore, the mast torque meter uses a stand pipe that rotates at the same velocity as the mast.

The document EP 1 317 663 A1 describes a magnetic torque sensor system. A shaft subject to torque about its axis has an axial bore. A region of the shaft has a stored magnetisation, the region being permanently magnetised with circumferential magnetisation about the axis or an annulus of longitudinal magnetisation. The stored magnetisation emanates a torque-dependent field into the bore. A magnetic field sensor arrangement is positioned in the bore to produce a torque-dependent signal. The document also describes the relationship between the radial depth of the permanent magnetisation in region relative to the shaft wall thickness. Magnetic sensor placements include axial or offset arrangements of pairs of sensors. Dependent on the nature of the field to be sensed, sensors may be oriented axially, radially or tangentially with respect to the axis.

The document EP 3 961 177 B1 describes a measurement apparatus for determining a bending moment acting on a hollow cylindrical body, similar to a rotor mast, in a current state. The measurement apparatus may include a sensor support structure, a sensor arrangement with sensors, and a processing system. The processing system may determine displacements of the inner surface of the hollow cylindrical body relative to the sensors based on the distances measured in the current state compared to the distances measured during an initial undeformed state, and determine the bending moment acting on the hollow cylindrical body based on the displacements.

The measurement apparatus has a sensor arrangement that uses distance measurement devices, which may be less sensitive to the harsh environments that strain gauges. However, maintenance and repair of this sensor arrangement still requires the removal of the sensor support structure from the rotor mast, which often requires a deinstallation of the rotor shaft using special tooling, which is very costly and time-consuming, leading to long ground times for the associated rotorcraft.

Solutions for recording damage to rotor blades use optical sensors that are typically less sensitive to harsh environments than strain gauges directly on the rotor blades.

The document JP 2004 333378 A describes an optical fiber sensor where a Bragg lattice is formed and provided on a blade, and a data collection unit equipped with a laser transmitter and a light measuring device is also provided on the blade. A light signal for evaluation is transmitted from the laser transmitter to the optical fiber sensor, and a returned light signal is received and measured by the light measuring device, to thereby measure a strain of the blade. Hereby, time history data of a load applied to the blade driven rotationally can be acquired, and the service life of the blade can be evaluated from the data.

The document RU 2013 135204 A describes a system with sensors, and particularly optical sensors, installed on rotor blades of a helicopter, which convert a signal that changes when there is mechanical damage, and a block recorder that is used to process the signals of the sensors.

Both of these documents merely measure strain on the rotor blades and record the measured strain on the rotor blades for providing service life estimates during maintenance of the rotor blades. However, none of the above described solutions provides real-time information about the bending moments acting on the rotor shaft during operation of the rotor blades to the pilots of a rotary-wing aircraft nor do these solutions describe a real-time alert system to determine whether the rotor shaft was stressed beyond a certain threshold.

SUMMARY

Based on the limitations and drawbacks of the prior art, an objective is to provide a measurement apparatus for determining a bending moment acting on a rotor shaft of a rotary-wing aircraft. The measurement apparatus should have low fault susceptibility relative to ambient conditions such as temperature, vibrations, and oscillations, be relatively simple, lightweight, and have low purchase and maintenance costs. The measurement apparatus should be easily accessible and replaceable, perform precise measurements, and be insensitive to electromagnetic interference.

These objectives are solved by a measurement apparatus. More specifically, a measurement apparatus for determining a bending moment acting on a rotor shaft of a rotary-wing aircraft includes a sensor arrangement that is mounted to a rotor blade that is attached to the rotor shaft. The sensor arrangement includes a cable and at least one sensor that generates a signal in response to a force or moment that acts on the rotor blade. The cable is connected to the at least one sensor for transmitting the signal. The measurement apparatus further includes a processing system that is connected to the cable and that receives the signal from the at least one sensor via the cable, wherein the processing system determines the bending moment acting on the rotor shaft based on the signal from the at least one sensor.

Instead of directly monitoring the rotor mast bending moment through electrical strain gauges that are deployed on the inner surface of the rotor mast, the present measurement apparatus determines the bending moment on the rotor shaft or rotor mast indirectly by determining local strain, displacement or angle on the flexbeam and/or rotor blade. The measured local strain, displacement or angle on the flexbeam and/or rotor blade can be correlated through additional sensors, such as the magnetic pick-up, to the rotor shaft bending moment magnitude and rotor shaft bending moment azimuth angle through the processing system.

Consider the scenario with an illustrative measuring environment with two separate structures including a rotor blade that is attached to a rotor shaft or rotor mast. Consider further that the bending moment of the primary structure (e.g., rotor shaft or rotor mast) is of interest, while the secondary structure (e.g., flexbeam and/or rotor blade) includes the sensing element. Both structures have to be fixed together to ensure a direct transfer of the load path from the secondary structure to the primary structure. Such an indirect measurement approach is of particular interest if there is limited access to the primary structure to place a sensing element or to avoid tedious maintenance actions. The bending moment magnitude and azimuth angle of the primary structure (e.g., rotor shaft or rotor mast) can be determined by a processing system as a result of the loading environment acting on the secondary structure.

For the present technology, maintenance can be completely eliminated thanks to a suitable sensor arrangement. This is particularly crucial due to the pressing need to improve maintenance actions on rotary-wing aircrafts. In particular, the maintainability of the fiber optic sensors is obsolete, if such sensors avoid impairing the fatigue behavior and life of the rotor blade.

Further benefits are seen in the multiple and simultaneous use of measurements taken from the sensors on the secondary structure. While current solutions for determining the mast bending moment are restricted to measuring the mast bending moment directly, the present technology not only allows monitoring the mast bending moment but can simultaneously be used for the dynamic characterisation of blade dynamics, the derivation of blade shape through an algorithm (i.e., if only strain measurements would be taken) to validate aeroelastic tools, increasing traceability of a product's life cycle, saving installation and calibration time during ground and flight test instrumentation, enabling predictive maintenance, such as usage-based maintenance through direct load recognition of the main rotor, and rotor tracking and measurement of lead-lag error of single blades for which all rotor blades or flexbeams of a rotor need to be equipped with such sensors.

Providing valuable information about the lagging movement of the blade would increase the understanding of lead-lag positioning errors of single blades as well as detection of high lead-lag moments due to lead-lag resonance condition during operations (e.g., mishandling) of the rotary-wing aircraft. The collected information could also be a direct input for applications in the area of predictive maintenance, such as usage-based maintenance.

According to one aspect, the force or moment causes at least one of a strain, a displacement, or an angle change of the rotor blade.

Illustratively, the sensor arrangement comprises at least one additional sensor.

By way of example, the sensor arrangement is an embedded sensor arrangement, a surface integrated sensor arrangement, or a surface applied sensor arrangement.

According to one aspect, the rotor blade comprises a flexbeam, and the sensor arrangement is mounted to the flexbeam.

By way of example, the cable comprises a fiber optic cable, and the at least one sensor comprise at least one optical sensor.

Illustratively, an optical sensor of the at least one optical sensor comprises a fiber-Bragg grating (FBG) in the fiber optic cable.

In some implementations, the processing system further comprises an interrogator that sends light having a first wavelength profile to the at least one optical sensor, and wherein the at least one optical sensor reflects light having a second wavelength profile as the signal back to the processing system.

According to one aspect, a change of the force or moment that acts on the rotor blade causes a change of the second wavelength profile.

In some implementations, the processing system further comprises a storage circuit that stores a reference signal measured during an initial undeformed state of the rotor blade; and a processing unit that retrieves the reference signal from the storage circuit to determine an additional bending moment acting on the rotor blade based on the reference signal from the storage circuit and the signal from the at least one sensor.

Illustratively, the processing unit further comprises an arithmetic logic unit that determines a magnitude and an azimuth angle of the bending moment based on the additional bending moment acting on the rotor blade.

By way of example, the measurement apparatus further comprises a display that displays the magnitude and the azimuth angle of the bending moment.

According to one aspect, the measurement apparatus further comprises an alert system that provides at least one of a visual alarm or an aural alarm when the magnitude of the bending moment is greater than a predetermined threshold value.

Furthermore, a measurement apparatus includes a processing system and a sensor arrangement, wherein the sensor arrangement is mounted to a rotor blade that is attached to the rotor shaft, and wherein the sensor arrangement further comprises at least one optical sensor and a fiber optic cable that connects the at least one optical sensor with the processing system. A method of operating such a measurement apparatus for determining a bending moment acting on a rotor shaft of a rotary-wing aircraft comprises: with an interrogator in the processing system, sending light having a first wavelength profile to the at least one optical sensor, wherein the at least one optical sensor reflects light having a second wavelength profile back to the processing system; with the processing system, detecting a change in the second wavelength profile compared to the second wavelength profile in an initial undeformed state of the rotor blade; in response to detecting the change of the second wavelength profile, using the processing system to determine an additional bending moment that acts on the rotor blade; and using an arithmetic logic unit in the processing system to determine a magnitude and an azimuth angle of the bending moment acting on the rotor shaft based on the additional bending moment that acts on the rotor blade.

In some implementations, the method further comprises: using a display to display the magnitude and the azimuth angle of the bending moment; and using an alert system to provide at least one of a visual alarm or an aural alarm in response to detecting that the magnitude of the bending moment is greater than a predetermined threshold value.

BRIEF DESCRIPTION OF THE DRAWINGS

Embodiments are outlined by way of example in the following description with reference to the attached drawings. In these attached drawings, identical or identically functioning components or elements are labeled with identical reference numbers and characters and are, consequently, only described once in the following description.

DETAILED DESCRIPTION

Figure 1:
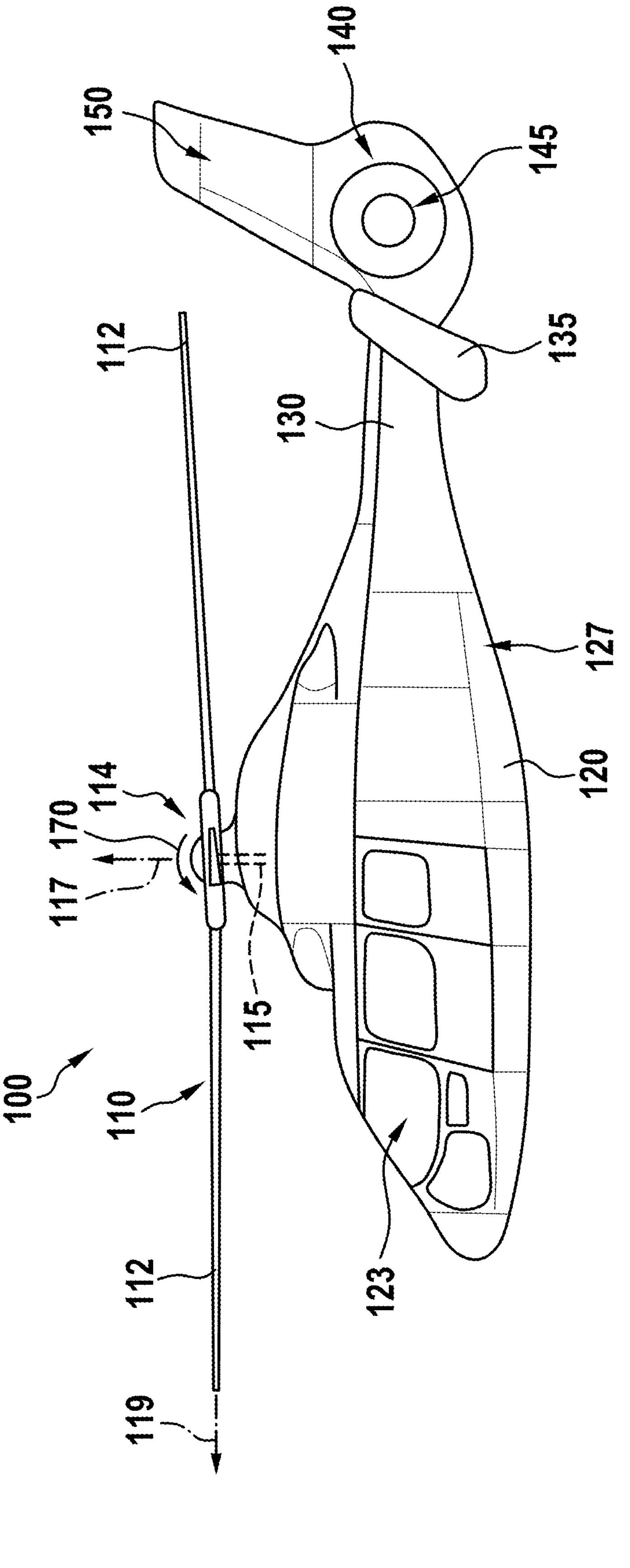
FIG. 1 is a diagram of an illustrative rotary-wing aircraft having a rotor with a rotor shaft.

FIG. 1 is a diagram of an illustrative rotary-wing aircraft 100 having at least one rotor 110 with a rotor shaft 115. As shown in FIG. 1, the rotary-wing aircraft 100, which is sometimes also referred to as rotorcraft 100, is exemplarily illustrated as a helicopter. Thus, for purposes of simplicity and clarity, the rotorcraft 100 is hereinafter referred to as the "helicopter" 100.

Illustratively, helicopter 100 may have a fuselage 120 that forms an airframe of the helicopter 100. The fuselage 120 is connected to a suitable landing gear and exemplarily forms a cabin 123 and a rear fuselage 127. The rear fuselage 127 is connected to a tail boom 130.

By way of example, helicopter 100 may include at least one counter-torque device 140 configured to provide counter-torque during operation, i.e., to counter the torque created by rotation of the at least one rotor 110 for purposes of balancing the helicopter 100 in terms of yaw. If desired, counter-torque device 140 may be shrouded. The at least one counter-torque device 140 is illustratively provided at an aft section of the tail boom 130 and may have a tail rotor 145.

The aft section of the tail boom 130 may include a fin 150. Illustratively, the tail boom 130 may be provided with a suitable horizontal stabilizer 135.

Illustratively, helicopter 100 may have at least one rotor 110, which is illustratively provided as a multi-blade rotor 110, for providing lift and forward or backward thrust during operation. The at least one multi-blade rotor 110 comprises a plurality of rotor blades 112 that are mounted at an associated rotor head 114 to a rotor shaft 115, which is sometimes also referred to as rotor mast 115.

The rotor shaft 115 may be a cylindrical body with first and second ends. Rotor blades 112 may be attached to the first end of the rotor shaft 115. The second end of the rotor shaft 115 may be installed within a gearbox. The rotor shaft 115 rotates in operation of the helicopter 100 around an associated rotor axis 117 in a rotor plane 119.

The rotor shaft 115 may be in a current state when rotor blades 112 rotate around rotor axis 117. The current state may be compared to an initial state when rotor blades 112 stand still. The initial state may have been determined beforehand, corresponding to the initial undeformed state of the rotor shaft 115.

Forces and/or moments may act on the rotor blades 112 during the rotation of the rotor blades 112 around the rotor axis 117. The forces and/or moments that act on the rotor blades 112 may lead to a displacement of the rotor shaft 115 in a direction that is perpendicular to the rotor axis 117, and thereby to a bending moment 170 acting on the rotor shaft 115. The displacement of the rotor shaft 115 may increase with the distance from the second end of the rotor shaft 115 that is installed within the gearbox.

The relationship between the magnitude of the displacement of the rotor shaft 115 and the forces and/or moments acting on the rotor blades 112 may be used to calibrate a measurement apparatus.

For example, the magnitude of the bending moment 170 acting on the rotor shaft 115 and the magnitude of the forces and/or moments acting on the rotor blades 112 may have a linear dependency on each other.

Thus, a measurement apparatus for determining the bending moment 170 that acts on the rotor shaft 115 may include measuring the forces and/or moments acting on the rotor blades 112.

Figure 2:
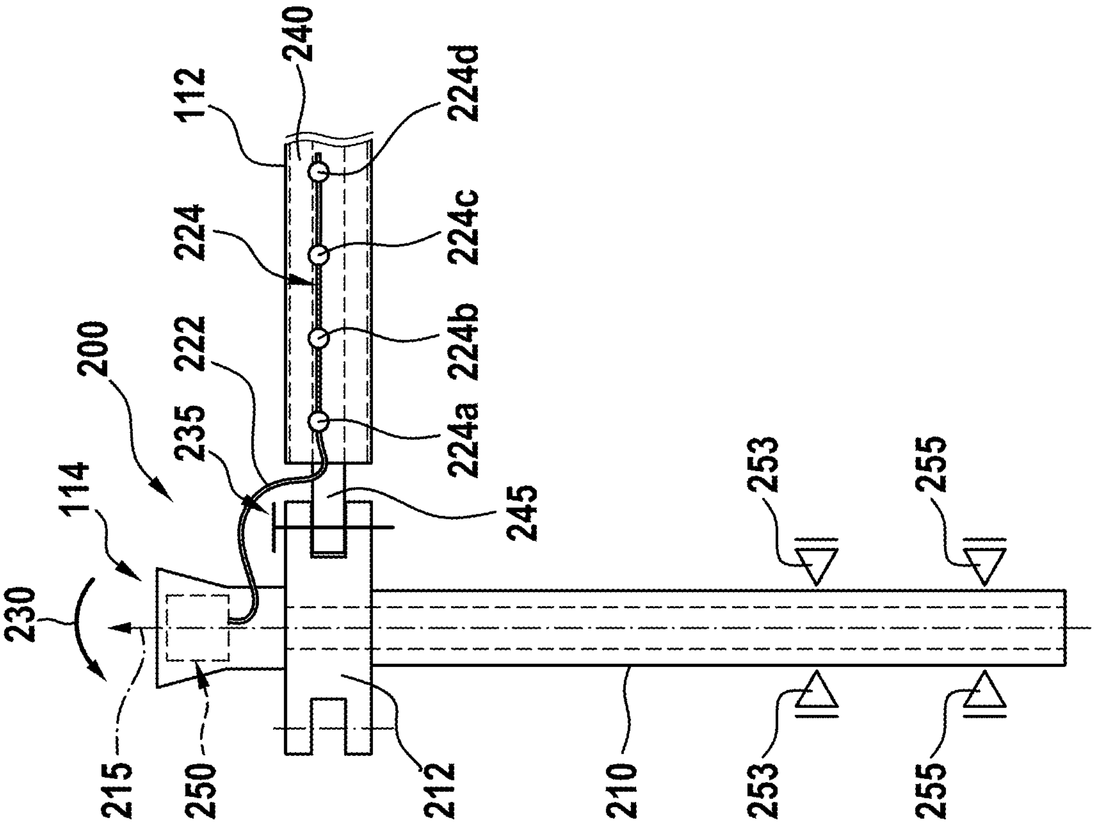
FIG. 2 is a diagram of an illustrative rotor shaft with a rotor blade and an illustrative measurement apparatus for determining a bending moment acting on the rotor shaft.

FIG. 2 is a diagram of an illustrative rotor shaft 210 with a rotor blade 112 and an illustrative measurement apparatus 200 for determining a bending moment 230 acting on the rotor shaft 210.

As shown in FIG. 2, rotor shaft 210 may be a cylindrical body 210 that rotates around rotational height axis 215. When the rotor shaft 210 rotates around rotational height axis 215, the rotor shaft 210 is sometimes also referred to as being in a dynamic state or current state. When the rotor shaft 210 stands still (i.e., when the rotor shaft 210 is not rotating), the rotor shaft 210 is sometimes also referred to as being in a static state. When the rotor shaft 210 stands still or when the rotor shaft 210 rotates but no cyclic stick is used, no bending moments are acting on the rotor shaft 210. When no bending moments are acting on the rotor shaft 210, the rotor shaft 210 is sometimes also referred to as being in an initial undeformed state.

Illustratively, rotor shaft 210 may have an attached end and a free end. The attached end of rotor shaft 210 may be installed within a gearbox. For example, rotor shaft 210 may be rotatably attached to the gearbox at upper and lower bearings 253, 255.

By way of example, rotor blades 112, illustratively shown as a single rotor blade 112 in FIG. 2, may be attached to the free end of rotor shaft 210. Other components such as a pitch link (not shown) may be attached to the free end of rotor shaft 210, if desired. As shown in FIG. 2, the illustrative rotor blade 112 may include a pitch control cuff 240 and a flexbeam 245, and a fastener 235 may attach the flexbeam 245 to a rotor hub 212, which is fixedly attached to the rotor shaft 210.

In operation, rotor shaft 210 may rotate around rotational height axis 215. The rotating blades may induce various different loads to rotor shaft 210. For example, bending moments 230 may be induced into rotor shaft 210.

If desired, measurement apparatus 200 may be provided for determining the bending moment 230 that acts on the rotor shaft 210. Such a measurement apparatus 200 for determining a bending moment 230 acting on a rotor shaft 210 of a rotary-wing aircraft (e.g., rotary-wing aircraft 100 of FIG. 1) includes a processing system 250 and a sensor arrangement 224 that is mounted to a rotor blade 112 that is attached to the rotor shaft 210. The sensor arrangement 224 includes at least one sensor 224*a*, 224*b* that generates a signal in response to a force or moment that acts on the rotor blade 112. For example, the at least one sensor 224*a*, 224*b* may measure strain or displacement on the rotor blade 112 that results from the force or moment acting on the rotor blade 112.

If desired, the sensor arrangement 224 may include at least one additional sensor 224*c*, 224*d*. As shown in FIG. 2, the sensor arrangement 224 includes four sensors 224*a*, 224*b*, 224*c*, 224*d*. In some implementations, the sensor arrangement 224 may include less than four sensors. In other implementations, the sensor arrangement 224 may include more than four sensors. For example, the sensor arrangement 224 may include five, six, seven, or more sensors.

In some implementations, the sensor arrangement 224 including the at least one sensor 224*a*, 224*b* may be mounted to the pitch control cuff 240 of the rotor blade 112. In other implementations, the sensor arrangement 224 may be mounted to the flexbeam 245. In yet other implementations, the sensor arrangement 224 may be mounted to the blade further away from the rotor hub 212 beyond the pitch control cuff 240. If desired, the sensor arrangement 224 may be mounted to the pitch control cuff 240 and/or the flexbeam and/or the blade further away from the rotor hub 212 beyond the pitch control cuff 240. For example, a first group of sensors may be mounted to the blade further away from the rotor hub 212 beyond the pitch control cuff 240, a second group of sensors may be mounted to the pitch control cuff 240, and a third group of sensors may be mounted to the flexbeam 245.

FIG. 2 shows a sensor arrangement 224 that is mounted to the single rotor blade 112. In some implementations, at least one other rotor blade (not shown) may be equipped with a sensor arrangement such as the sensor arrangement 224 shown on rotor blade 112.

The sensor arrangement 224 further includes a cable 222 that is connected to the at least one sensor 224*a*, 224*b* for transmitting a signal associated with a measured force or moment acting on the rotor blade. In some implementations, the cable 222 may be an electrical cable for transmitting an electrical signal, and the at least one sensor 224*a*, 224*b* may include at least one strain gauge that generates the electrical signal. In other implementations, the cable 222 may be a fiber optical cable for transmitting an optical signal, and the at least one sensor 224*a*, 224*b* may include at least one optical sensor.

Figure 6:
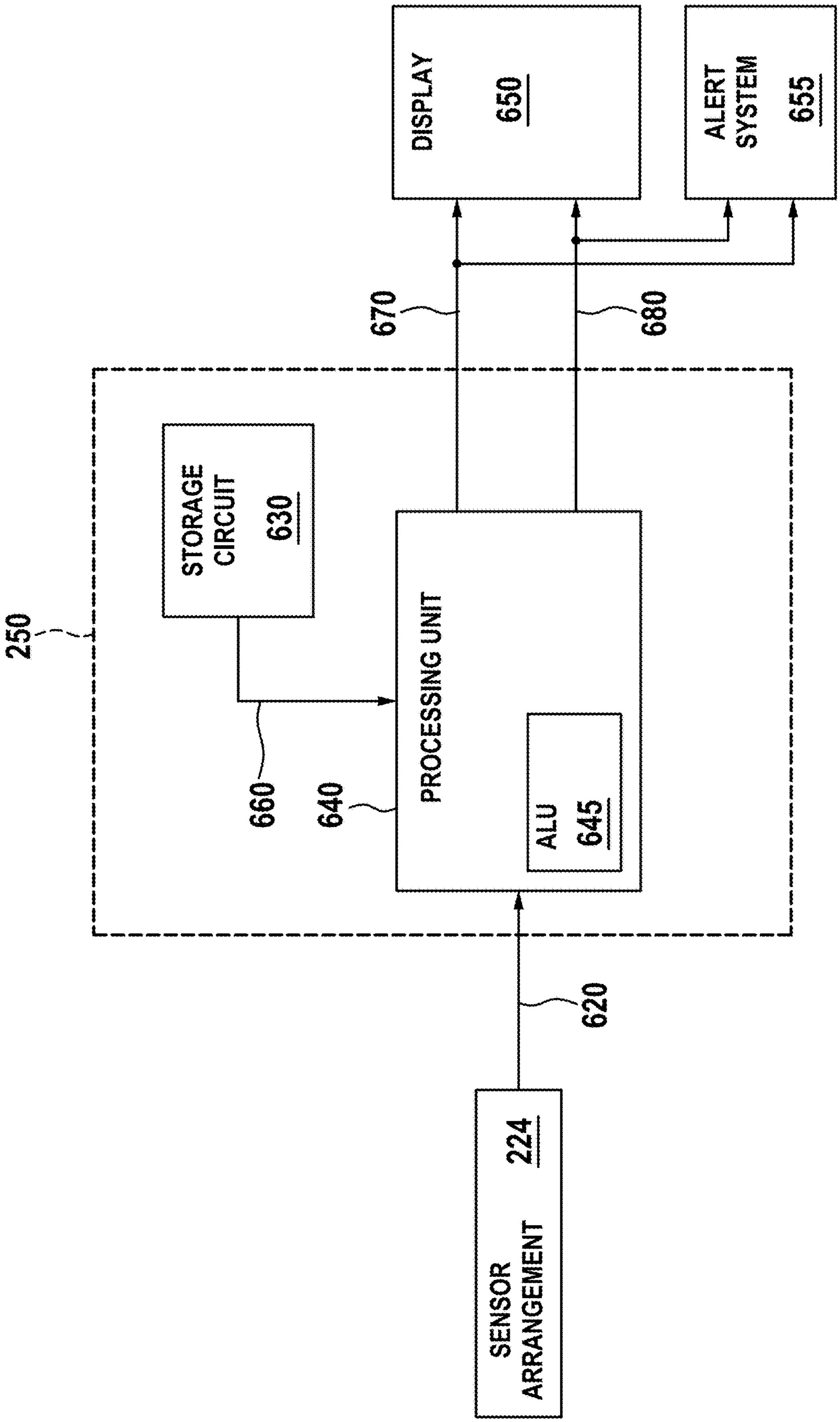
FIG. 6 is a diagram of an illustrative processing system of an illustrative measurement system that receives a signal from a sensor and provides bending moment magnitude and bending moment azimuth angle to a display and an alert system.

Measurement apparatus 200 may include a processing system 250 as described in more detail in FIG. 6. The processing system 250 is connected to the cable 222 and receives the signal from the at least one sensor 224*a*, 224*b* via the cable 222. The processing system 250 determines the bending moment 230 acting on the rotor shaft 210 based on the signal from the at least one sensor 224*a*, 224*b*.

As shown in FIG. 2, the processing system 250 may be located in the rotor head 114. Alternatively, the processing system 250 may be located in or on another part of the rotating frame. For example, the processing system 250 may be located in the rotor hub 212 or on the rotor shaft 210, just to name a few possible locations. If desired, the processing system 250 may be located in or on the fixed frame (i.e., on the non-rotating parts of the rotary-wing aircraft such as the fuselage).

In some implementations, the processing system 250 may be located either completely in or on the rotating frame or in or on the fixed frame. In other implementations, some portions of the processing system 250 may be located in or on the rotating frame and other portions of the processing system 250 may be located in or on the fixed frame.

Figure 5:
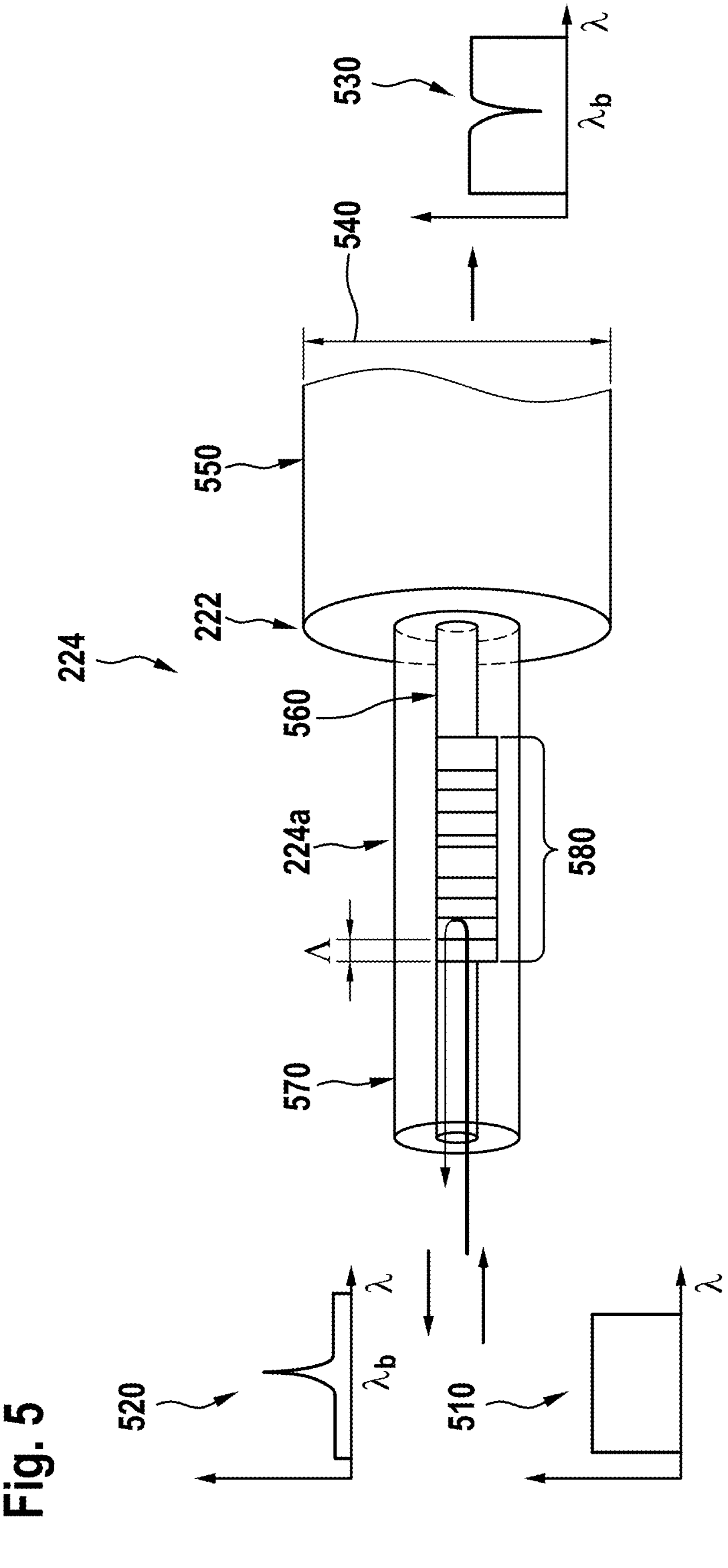
FIG. 5 is a diagram of an illustrative fiber optic cable with a fiber optic sensor that includes a fiber Bragg grating.

As an example, an interrogator that sends light into the fiber optic cable 222 as described in more detail with respect to FIG. 5 may be positioned in the rotating frame. As another example, an arithmetic logic unit (ALU) or a storage circuit within the processing system 250 as described in more detail with respect to FIG. 6 may be positioned in the fixed frame.

Independent of the positioning of portions of the processing system 250, power and data may be transferred between the rotating frame and the fixed frame. As an example, power and data may be transferred between the rotating frame and the fixed frame via a slip ring and a wired connection. As another example, power and data may be transferred between the rotating frame and the fixed frame wirelessly. As yet another example, power may be transferred between the rotating frame and the fixed frame via a slip ring and a wired connection, which data is transferred wirelessly between the rotating frame and the fixed frame.

Figure 3B:
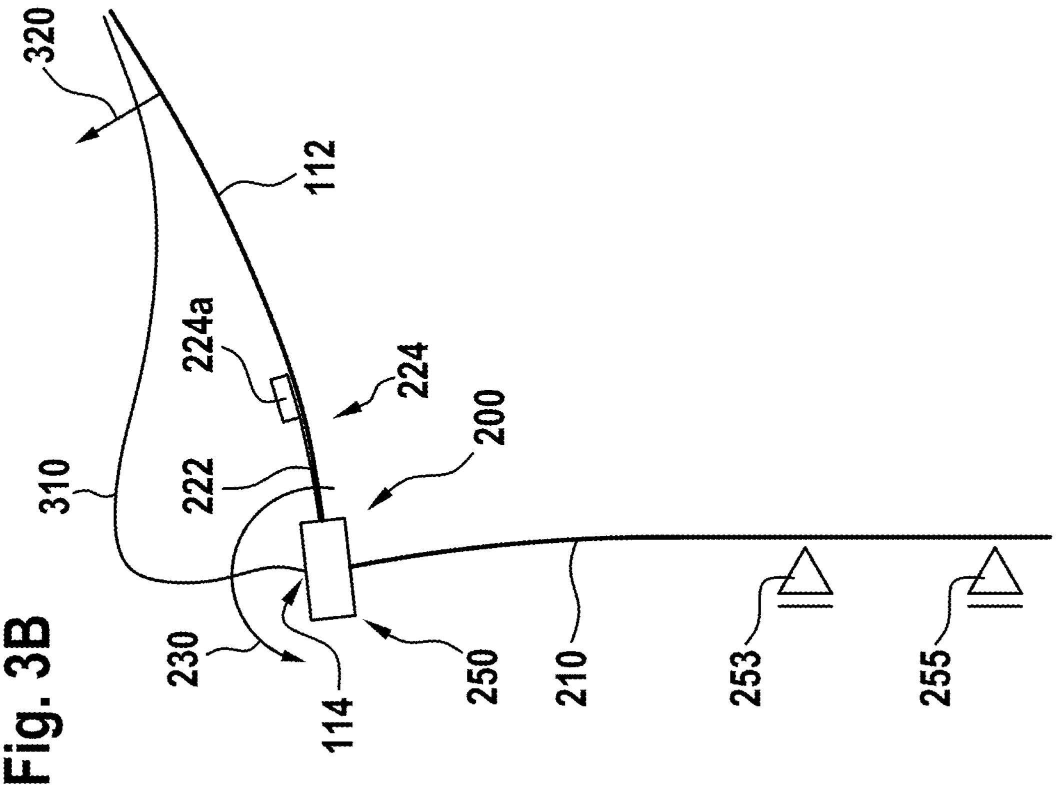
FIG. 3B is a diagram of an illustrative rotor shaft with a rotor blade and an illustrative measurement apparatus for determining a bending moment acting on the rotor shaft when an upward force or moment is acting on the rotor blade.
Figure 3A:
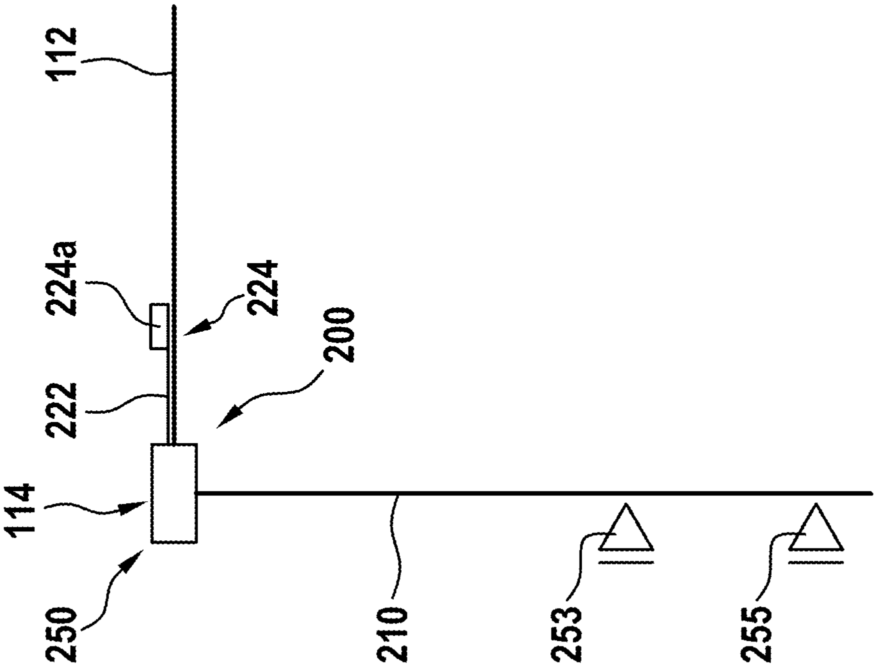
FIG. 3A is a diagram of an illustrative rotor shaft with a rotor blade and an illustrative measurement apparatus for determining a bending moment acting on the rotor shaft when the rotor shaft stands still.

FIG. 3A is a diagram of an illustrative rotor shaft 210 with a rotor blade 112 and an illustrative measurement apparatus 200 for determining a bending moment acting on the rotor shaft when the rotor shaft 210 stands still (i.e., when the rotor shaft 210 is not rotating).

When the rotor shaft 210 stands still, the rotor shaft 210 is sometimes also referred to as being in a static state or as being in an initial undeformed state. In fact, the rotor blades 112 of a multi-blade rotor are usually arranged point-symmetrically to the rotor axis (e.g., rotor axis 117 of FIG. 1) at the rotor hub such that, in the absence of wind, no bending moments are acting on the rotor shaft 210 when the rotor shaft 210 stands still.

FIG. 3B is a diagram of an illustrative rotor shaft 210 with a rotor blade 112 and an illustrative measurement apparatus 200 for determining a bending moment 230 acting on the rotor shaft 210 when an upward force or moment 320 is acting on the rotor blade 112.

For example, the rotor shaft 210 may rotate around a rotational height axis in a current state, and wind, turbulences, or a flight maneuver may cause a force or moment 320 that acts on the rotor blade 112.

Illustratively, the force or moment 320 may cause at least one of a strain, a displacement, or an angle change at the rotor blade 112. The strain, displacement or angle change at the rotor blade 112 may be illustrated by a strain distribution 310 in the rotor blade 112. A sensor arrangement 224 with at least one sensor 224*a* may measure the strain, displacement, or angle change at the rotor blade 112 that is associated with the strain distribution 310 and send a corresponding signal via cable 222 to a processing system 250.

The processing system 250 receives the signal from the at least one sensor 224*a* via the cable 222 and determines the bending moment 230 that acts on the rotor shaft 210 based on the signal from the at least one sensor 224*a*. Thus, the processing system 250 determines the bending moment 230 acting on the rotor shaft 210 based on measuring the strain, displacement, or angle change at the rotor blade 112.

As shown in FIGS. 3A and 3B, sensor 224*a* may be placed on top of rotor blade 112. However, sensor 224*a* may be attached differently to the rotor blade 112.

Figure 4:
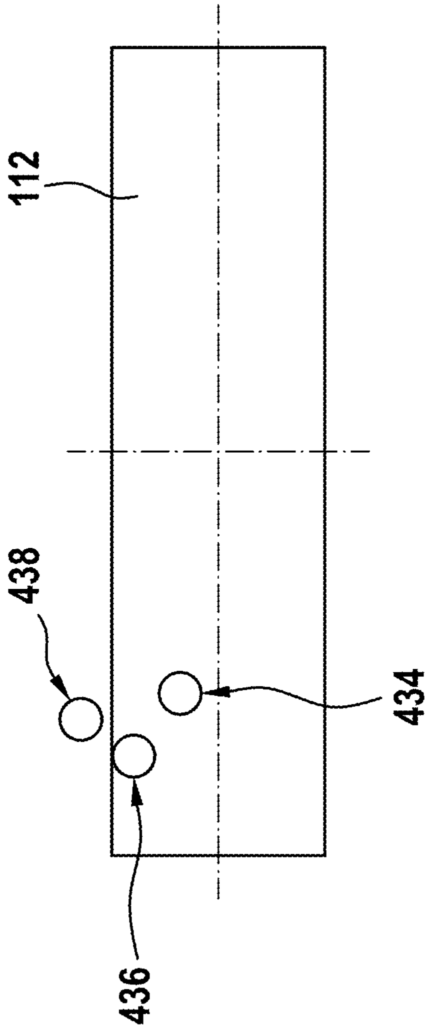
FIG. 4 shows an illustrative cross-section of a flexbeam with an illustrative sensor arrangement on a rotor blade.

FIG. 4 shows an illustrative cross-section of a flexbeam with an illustrative sensor arrangement (e.g., sensor arrangement 224 with sensors 224*a* of FIG. 3A or 3B) on a rotor blade 112.

As an example, the sensor arrangement may be an embedded sensor arrangement 434 in which the sensors and at least a portion of the cable that connect the sensors with the processing unit are embedded in the rotor blade 112. An embedded sensor arrangement 434 has the advantage that the sensors are protected from environmental and operational hazards such as shear force and moisture, which may prolong the sensors' lifetime. However, replacing a damaged sensor of an embedded sensor arrangement 434 is comparably complicated and may require the replacement of the entire rotor blade 112.

In some implementations, the embedded sensor arrangement 434 may be realized using a fiber optic cable that includes a fiber core and around the fiber core concentric rings of (from interior to the exterior) a fiber cladding, a primary buffer, a secondary buffer, a strength member, and an outer jacket, whereby the secondary buffer diameter is 900 μm±60 μm.

In other implementations, the fiber optic cable of the embedded sensor arrangement 434 may have a diameter of 100 μm to 150 μm. In these implementations, a Teflon tube may be embedded in the rotor blade 112. The portion of the Teflon tube that is embedded in the rotor blade 112 may have a length of 4 cm to 6 cm and a diameter greater that 400 μm. The embedded sensor arrangement 434 may be positioned inside the Teflon tube to protect the fiber optic cable at the exit point of the rotor blade 112. If desired, the cable instrumentation may be adapted with qualified cable by splice.

As another example, the sensor arrangement may be a surface integrated sensor arrangement 436 in which the sensors and at least a portion of the cable that connect the sensors with the processing unit are integrated into the surface of the rotor blade 112. Such a surface integrated sensor arrangement 436 improves the accessibility of the sensors for maintenance compared to the embedded sensor arrangement 434. However, the sensors are, depending on the implementation of the surface integrated sensor arrangement 436, partially exposed to environmental and operational hazards.

Illustratively, the surface integrated sensor arrangement 436 may be implemented with a groove that is formed in the rotor blade 112 (e.g., through a fixed provision or wire cable) and that receives the sensor arrangement.

As yet another example, the sensor arrangement may be a surface applied sensor arrangement 438 in which the sensors and the cable are attached to the surface of the rotor blade 112. Such a surface applied sensor arrangement 438 has the advantage that the damaged sensors and/or a damaged cable can easily be replaced. However, the sensors and the cable as well as any adhesive used to fix the sensor arrangement 436 to the surface of the rotor blade 112 are unprotected from environmental and operational hazards, and therefore more likely to fail than the sensors and the cable of a surface integrated sensor arrangement 436 or an embedded sensor arrangement 434.

As mentioned above, the cable may be a fiber optical cable for transmitting an optical signal, and the sensors may include at least one optical sensor. FIG. 5 is a diagram of an illustrative fiber optic cable 222 with a fiber optic sensor that includes a fiber-Bragg grating (FBG) 580 in the fiber optic cable 222.

A fiber optic cable 222 that contains FBGs is very light weight, comparably small in dimensions, immune to electromagnetic interference, flexible, strong, compatible with composite materials, and no electrical power is needed for each sensor. For example, the fiber optic cable may have a fiber optic cable diameter 540 of 80 μm.

Illustratively, fiber optic cable 222 may include a fiber core 560 (e.g., a glass fiber cable) that transmits light. The fiber core 560 may be surrounded by a fiber cladding 570 such that light is reflected from the fiber cladding 570 back into the fiber core 560 which assures minimum transmission loss. In fact, the fiber core 560 may have a higher refractive index $\eta$ than the fiber cladding 570 which leads to complete reflection at the border between the fiber core 560 and the fiber cladding 570.

As shown in FIG. 5, the fiber optic cable 222 may include a protection jacket 550 (e.g., a coating). The protection jacket 550 may protect the fiber cladding 570 and the fiber core 560 from external conditions and physical damage.

A fiber optic sensor 224*a* such as a fiber-Bragg grating 580 modulates the characteristics of a propagating light source. An interrogator may be included in a processing system. For example, the processing system with the interrogator may be located on top of the rotor shaft together with a power supply as shown in FIG. 2. The interrogator may include a light source and send light having a first predetermined wavelength profile 510 to the fiber optic sensor 224*a*.

The fiber optic sensor 224*a* may reflect light having a second wavelength profile 520 as a signal back to the processing system. All other wavelengths of the input signal 510 may be transmitted unaffected through the fiber optic cable 222 as transmitted signal 530.

Illustratively, the fiber-Bragg grating acts as a wavelength selective mirror, reflecting a predetermined wavelength profile back through the fiber optic cable 222. Perturbation of the grating (e.g., by strain or temperature) results in a change in the reflected wavelength profile, which is the basis of the sensing approach. Thus, a change of the force or moment (e.g., force or moment 320 of FIG. 3) that acts on the rotor blade causes a change of the second wavelength profile 520. If desired, multiple optical sensors with center wavelengths are distributed in a specific nm wavelength band to ensure correct monitoring of the signals.

The fiber optic sensor 224*a* may sense a perturbation of the grating due to the force or moment on the rotor blade as a mechanical strain $\Delta\epsilon$ and/or due to a temperature change $\Delta T$. The characteristics of a fiber optic sensor 224*a* such as a fiber-Bragg grating 580 is defined by Bragg's law:

$$\lambda = 2n_{eff}\Lambda \tag{1}$$

The effective index $n_{eff}$ and period of the refractive index modulation $\Lambda$ are sensitive to the strain and temperature loading, so the reflective wavelength can be written:

For the mechanical strain:

$$\frac{\partial\lambda(\varepsilon)}{\lambda} = \frac{\partial n_{eff}}{n_{eff}\partial\varepsilon} + \frac{\partial\Lambda}{\Lambda\partial\varepsilon} \tag{2}$$

For the temperature:

$$\frac{\partial\lambda(T)}{\lambda} = \frac{\partial n_{eff}}{n_{eff}\partial T} + \frac{\partial\Lambda}{\Lambda\partial T} \tag{3}$$

The measured wavelength shift, $\Delta\lambda$ depending on the mechanical strain and the temperature change is defined as follows:

$$\frac{\Delta\lambda(T, \varepsilon)}{\lambda} = a\Delta T + b\Delta\varepsilon \tag{4}$$

For which the thermal sensitivity $\alpha$ is:

$$a = \frac{\Delta(n_{eff}\Lambda)}{n_{eff}\Lambda} = (c + \xi)\Delta T \tag{5}$$

where c is the coefficient of thermal expansion and $\xi$ is the thermo-optic coefficient.

An instrumented sample subjected to external stress causes deformation of the test body. This deformation induces a variation of the second wavelength profile 520 of the FBG 580 according to its sensitivity in direction of the coordinates of the test body in which the FGB 580 is embedded (e.g., in direction of cartesian coordinates x, y, z). The consideration of the correct strain sensitivity b is particularly important when the fiber optic sensor 224*a* such as a fiber-Bragg grating 580 is embedded within a host material. This strain sensitivity b is defined as:

$$b = \frac{\Delta(n_{eff}\Lambda)}{n_{eff}\Lambda} = \varepsilon_z - \frac{n_{eff}^2}{2}(\varepsilon_r(p_{12} + p_{11}) + p_{12}\varepsilon_z) \tag{6}$$

where $\varepsilon_z$ is the axial strain, $\varepsilon_r$ is the radial strain and $p_{12}$ and $p_{11}$ are Pockels strain optic coefficients.

FIG. 6 is a diagram of an illustrative processing system 250 of an illustrative measurement system (e.g., measurement system 200 of FIG. 2) that receives a signal 620 with measurement data from a sensor arrangement 224 and provides bending moment magnitude 670 and bending moment azimuth angle 680 to a display 650 and an alert system 655.

Illustratively, the display 650 may display the magnitude 670 and the azimuth angle 680 of the bending moment, thereby making the information visually available to a pilot of a rotary-wing aircraft.

If desired, the alert system 655 may provide at least one of a visual alarm or an aural alarm when the magnitude 670 of the bending moment is greater than a predetermined threshold value. As an example, the alert system 655 may sound a siren or make a clear voice announcement. As another example, the alert system 655 may flash a screen or display a message on a screen.

Processing system 250 is connected via a cable with sensor arrangement 224. Illustratively, the processing system 250 includes an interrogator as described with reference to FIG. 5. The interrogator may include a light source. By way of example, the interrogator may send light having a first predetermined wavelength profile to a fiber optic sensor of sensor arrangement 224.

Sensors of sensor arrangement 224 may be placed on or inside a rotor blade (e.g., as shown in FIG. 4) and measure a force or moment that acts on the rotor blade (e.g., as shown in FIG. 3B). Sensors of sensor arrangement 224 may send a signal 620 associated with the measured force or moment to processing system 250.

If desired, a first signal 620 may be measured during a calibration of processing system 250. The calibration of processing system 250 may include the setting of a zero-point reference or of signal scaling factors, if desired.

Processing system 250 may include a storage circuit 630. Storage circuit 630 may store the reference signal measured during the initial undeformed state. For example, the reference signal may include the wavelength profile of the reflected signal 520 of FIG. 5 when no force or moment is acting on the rotor blade.

Illustratively, processing system 250 may include a processing unit 640. For example, processing unit 640 may retrieve data such as the reference signal from the storage circuit 630 to determine an additional bending moment acting on the rotor blade based on the reference signal from the storage circuit 630 and the signal 620 from the at least one sensor of the sensor arrangement 224.

If desired, processing unit 640 may include an arithmetic logic unit (ALU) 645. Arithmetic logic unit 645 may determine a magnitude 670 and an azimuth angle 680 of the bending moment acting on the rotor shaft (e.g., bending moment 230 acting on rotor shaft 210 of FIG. 3B) based on the additional bending moment acting on the rotor blade (e.g., bending moment 320 acting on rotor blade 112 of FIG. 3B).

As an example, consider the scenario in which the sensors of sensor arrangement 224 are fiber optic sensors. Consider further that the processing system includes an interrogator that sends a light having a first predetermined wavelength profile (e.g., wavelength profile 510 of FIG. 5) to the fiber optic sensors of sensor arrangement 224 and that storage circuit 630 stores a reference signal with a second wavelength profile of the reflected signal (e.g., wavelength profile 520 of FIG. 5) that has been determined when no force or moment was acting on the rotor blade.

In this scenario, the processing unit 640 may receive a third wavelength profile from the sensors of sensor arrangement 224 that is different than the second wavelength profile when the additional bending moment is acting on the rotor blade. For example, the third wavelength profile may have a spike that is shifted to a lower or a higher wavelength compared to the spike of the second wavelength profile. The processing unit 640 may determine a bending moment acting on the rotor blade based on the difference between the second and third wavelength profiles.

Illustratively, processing system 250 may determine a magnitude 670 and an azimuth angle 680 of the bending moment acting on the rotor shaft based on the determined bending moment acting on the rotor blade. For example, processing unit 640 may determine magnitude 670 and azimuth angle 680 of the bending moment acting on the rotor shaft.

As an example, storage circuit 630 may store a lookup table with bending moment magnitude 670 and azimuth angle 680 of the bending moment acting on the rotor shaft depending on the measured force or moment acting on the rotor blade, and processing unit 640 may use the lookup table to retrieve the bending moment magnitude 670 and azimuth angle 680 that correspond to the measured force or moment acting on the rotor blade.

As another example, processing unit 640 may use arithmetic logic unit 645 to compute magnitude 670 and azimuth angle 680 of the bending moment based on a functional relationship between the bending moment and the measured force or moment acting on the rotor blade (e.g., a functional relationship that was determined during calibration of the measurement apparatus).

By way of example, the processing system 250 may record a first timestamp in storage circuit 630 when the magnitude of the bending moment starts to exceed a predetermined threshold value and a second timestamp when the magnitude of the bending moment ceases to exceed the predetermined threshold value. The processing unit 640 may retrieve the first and second timestamps from the storage circuit 630 and determine the duration of time between the first and second timestamps (e.g., using the arithmetic logic unit 645).

If desired, the processing unit 640 may further process and analyze the recorded information. For example, processing unit 640 may sample the magnitude 670 and/or the azimuth angle 680 of the bending moment in predetermined ranges over a duration of time (e.g., between two maintenance intervals).

If desired, the processing system 250 may provide the recorded information from the storage circuit 630 for further processing. As an example, the processing system 250 may provide the recorded information to a maintenance apparatus during maintenance. As another example, the processing system 250 may provide charts showing the magnitude and angle of the recorded bending moment depending on the time.

If desired, processing unit 640 may include at least one of a system self-test function, a calibration function that is adapted to setting a zero-point reference or signal scaling factors, or an output function that is adapted to selecting between providing analogue or digital output signals.

The processing system 250 may be implemented using different discrete components. As shown in FIG. 6, the discrete components may include a storage circuit 630, a processing unit 640, a display 650, and an alert system 655.

If desired, some or all discrete components of FIG. 6 may be combined and integrated inside a single component. As an example, alert system 655 may be integrated into a display 650 with speakers. As another example, processing unit 640 may have embedded memory circuitry, thereby combining processing unit 640 and storage circuit 630.

Figure 7:
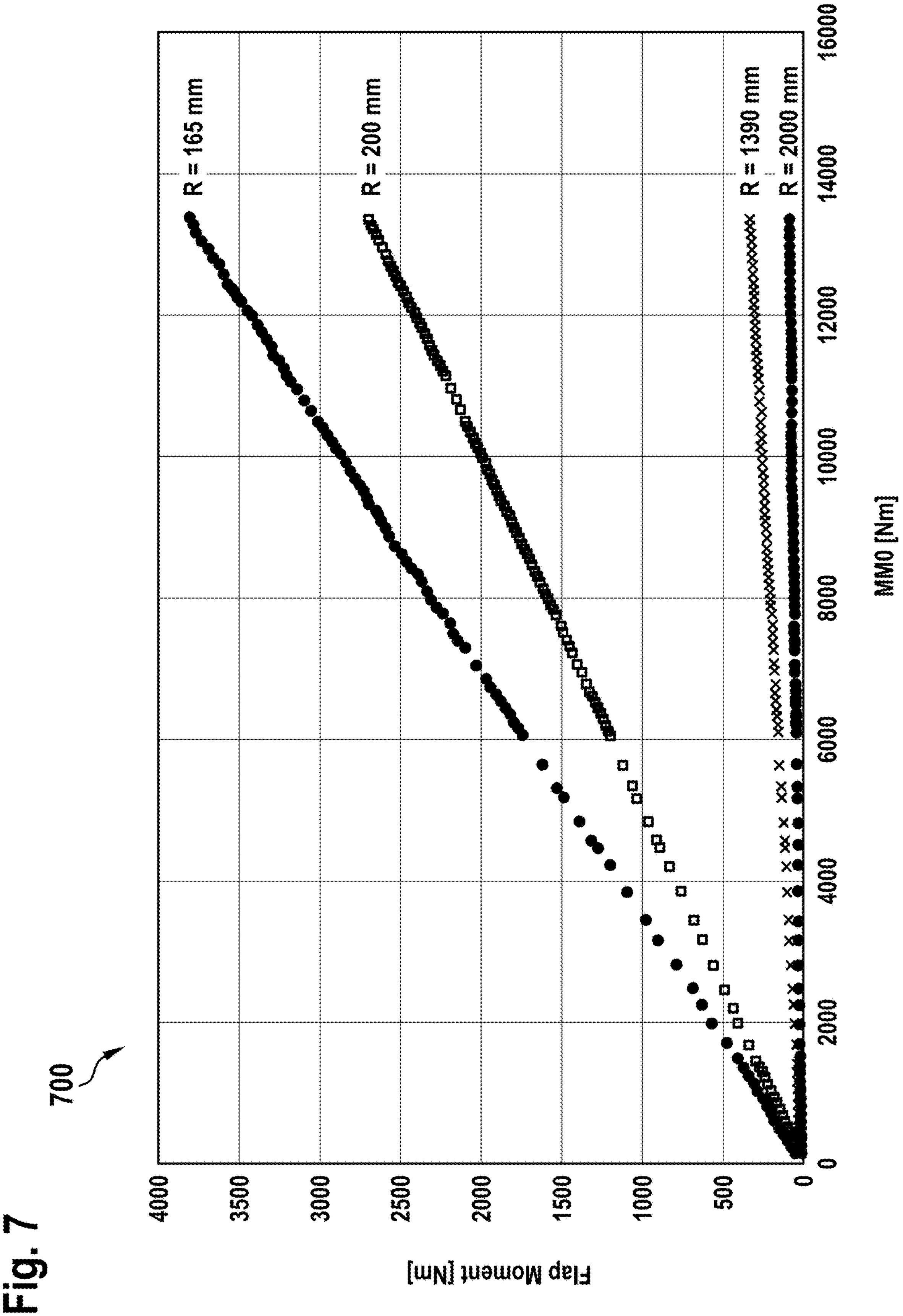
FIG. 7 is a diagram of an illustrative plot showing a relationship between a flapping bending moment acting on a rotor blade and a bending moment acting on a rotor shaft.

FIG. 7 is a diagram 700 of an illustrative plot. The y-axis of the plot shows a flapping bending moment acting on a rotor blade, and the x-axis of the plot depicts a bending moment acting on a rotor shaft, to which the rotor blade is attached. As shown in FIG. 7, there is a linear relationship between the flapping bending moment acting on the rotor blade and the bending moment acting on the associated rotor shaft for different rotor blade sizes.

Illustratively, there is a direct load transfer from the rotor blade to the rotor shaft. The relationship between the flapping bending moment acting on the rotor blade and a bending moment acting on the rotor shaft can be established experimentally for a particular rotor. For example, the relationship between the flapping bending moment acting on the rotor blade and the bending moment acting on the rotor shaft may be determined by load distribution measurements on full scale rotor blades (e.g., during a whirl tower test or during a ground/flight test on a rotary-wing aircraft) or by component test samples (e.g., laboratory tests of flex-control unit of a bearingless main rotor).

Figure 8:
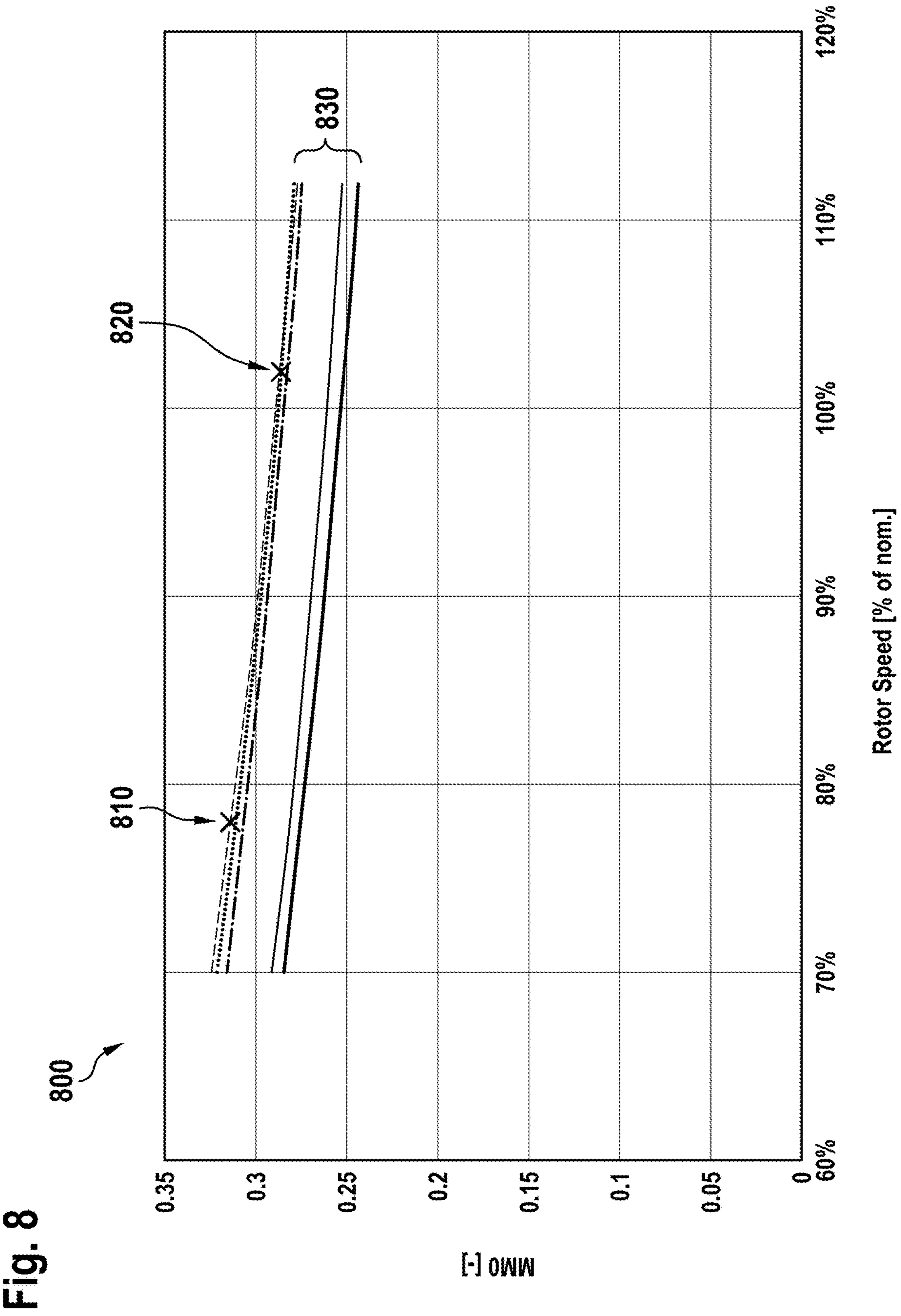
FIG. 8 is a diagram showing an illustrative dependency of the flapping moment of a rotor blade and the bending moment of a rotor shaft to the rotor speed.

FIG. 8 is a diagram 800 showing an illustrative dependency of the flapping moment of a rotor blade and the bending moment of a rotor shaft to the rotor speed. The x-axis of the diagram 800 shows the rotor speed in percentage of nominal, and the y-axis of the diagram 800 depicts the quotient of the flapping bending moment acting on a rotor blade divided by the bending moment acting on the associated rotor shaft.

The lines 830 in diagram 800 show analytical results for different multi-blade rotors. The analytical results 830 were further compared to flight test results 810, 820. The diagram reveals a deviation of 10-12% of the measured data from the expected data. The deviation may be reduced by a combination of analytical and experimental methods. Such methods may improve the accuracy of the analytical relationship and enable to consider deviations from nominal rotor operating conditions by analytical results.

In some implementations, it may be desirable to use the sensor arrangement on the rotor blade for other purposes in addition to monitoring the bending moment of the rotor shaft. In such implementations, special care should be taken for placing the sensors on the rotor blade (e.g., flexbeam, pitch control cuff, blade). This is especially important in case of characterizing blade dynamics for which the sensors have to be located in such a way that with a minimum number of sensors the maximum amount of information can be obtained from the structure. For this purpose, the sensor positions in lengthwise direction of the rotor blade need to be determined carefully.

Figure 9:
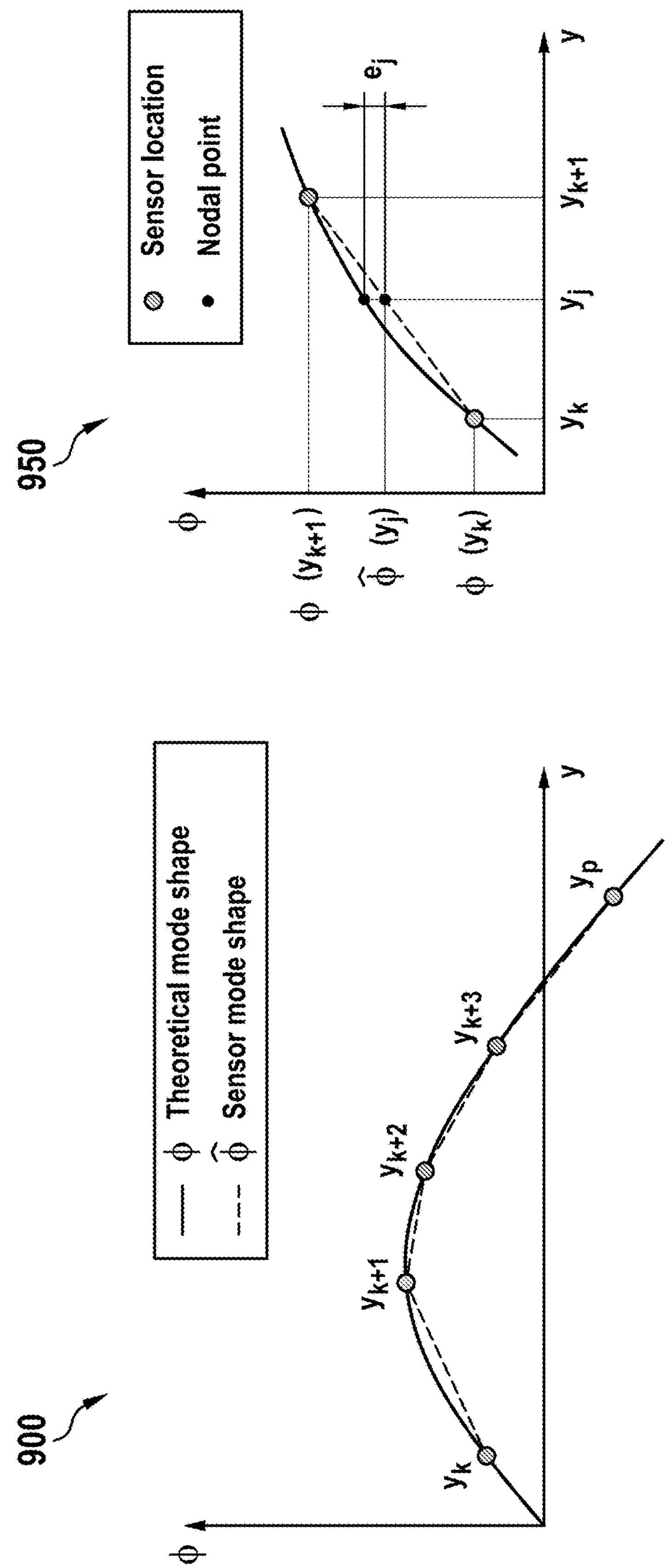
FIG. 9 is a diagram illustrating a method for optimizing sensor positions on the rotor blade in lengthwise direction.

FIG. 9 is a diagram illustrating a method for optimizing sensor positions on the rotor blade in lengthwise direction of the rotor blade. In particular, diagrams 900 and 950 show the mode shape determined at different y-positions on the rotor blade. Diagram 900 aims to illustrate the difference between the theoretical bending vs. the sensor measured bending, while diagram 950 aims to illustrate the measurement error due to interpolation between two sensor positions.

The method shown in FIG. 9 aims to minimize the total error between the theoretical mode shape $\phi_{ij}$ and the measured mode shape $\hat{\phi}_{ij}$ with j=1, 2, . . . , m corresponding to the number of mode shapes to be identified and i=1, 2, . . . , n to the number of nodal points.

Assuming that the sensors are located on the rotor blade at spanwise positions $y_k$ with k=1, 2, . . . , p being the number of sensors, the measured mode shape $\hat{\phi}_{ij}$ is obtained by linearly interpolating between the nodal points $y_i$ of the theoretical mode shape $\hat{\phi}_{ij}$. To calculate the error $e_{ij}(=\phi_{ij}-\hat{\phi}_{ij})$ between the measured mode shape $\hat{\phi}_{ij}$ and the theoretical mode shape $\phi_{ij}$ at each nodal point i for the $j^{th}$ mode, equation (7) is used to interpolate between two sensor positions $y_k$ and $y_{k+1}$:

$$\hat{\phi}_{ij} = \frac{\phi_{i_{y_k}}(y_{k+1}-y_i)+\phi_{i_{y_{k+1}}}(y_i-y_k)}{(y_{k+1}-y_k)} \quad (7)$$

The sensors at position $y_k$ are identified by minimizing the cost function shown in equation (8):

$$J = \sqrt{\frac{1}{n}\Sigma_{i=1}^{m}\Sigma_{j=1}^{n}\left(\phi_{ij}-\hat{\phi}_{ij}\right)^2} \quad (8)$$

Figure 10:
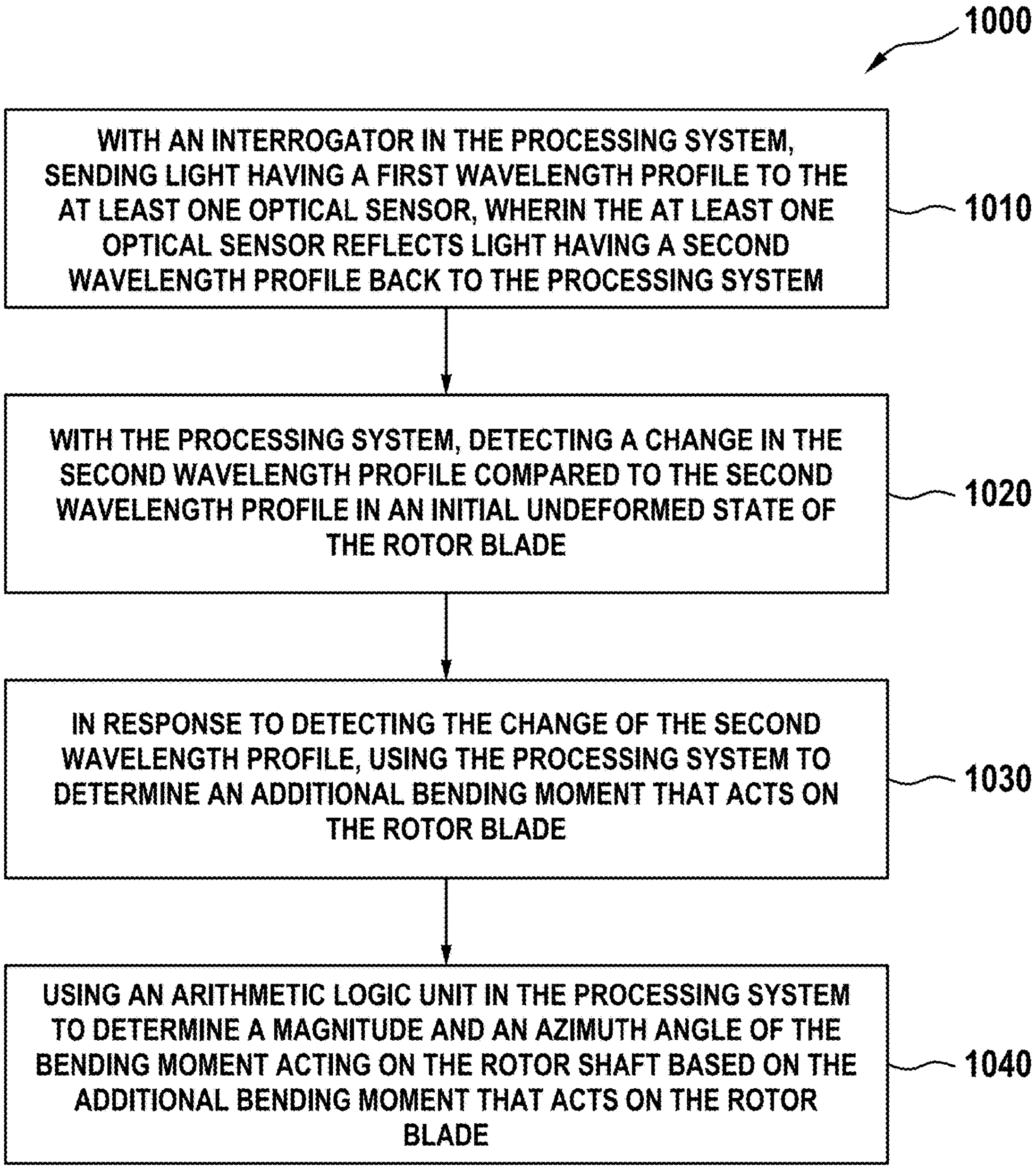
FIG. 10 is a flowchart showing illustrative operations that a measurement apparatus may perform to determine the bending moment acting on a rotor shaft of a rotary-wing aircraft.

FIG. 10 is a flowchart 1000 showing illustrative operations that a measurement apparatus (e.g., measurement apparatus 200 of FIG. 2) may perform to determine a bending moment acting on a rotor shaft of a rotary-wing aircraft (e.g., rotary-wing aircraft 100 of FIG. 1). The measurement apparatus includes a processing system and a sensor arrangement. The sensor arrangement is mounted to a rotor blade that is attached to the rotor shaft, and includes at least one optical sensor and a fiber optic cable that connects the at least one optical sensor with the processing system. For example, the measurement apparatus 200 of FIG. 2 includes a processing system 250 and a sensor arrangement 224. The sensor arrangement 224 is mounted to a rotor blade 112 that is attached to the rotor shaft 210 and includes at least one optical sensor **224*a*, 224*b* and a fiber optic cable 222 that connects the at least one optical sensor 224*a*, 224*b* with the processing system 250**.

During operation 1010, an interrogator in the processing system of the measurement apparatus sends light having a first wavelength profile to the at least one optical sensor, wherein the at least one optical sensor reflects light having a second wavelength profile back to the processing system. For example, an interrogator in the processing system 250 of the measurement apparatus 200 of FIG. 2 may send light having wavelength profile 510 of FIG. 5 to the at least one optical sensor **224*a*, 224*b*, and the at least one optical sensor 224*a*, 224*b* may reflect light having wavelength profile 520 of FIG. 5 back to the processing system 250**.

During operation 1020, the processing system of the measurement apparatus detects a change in the second wavelength profile compared to the second wavelength profile in an initial undeformed state of the rotor blade. For example, the processing system 250 of the measurement apparatus 200 of FIG. 2 may detect a change in the wavelength profile 520 of FIG. 5 compared to the wavelength profile 520 in an initial undeformed state of the rotor blade 112.

In response to detecting the change of the second wavelength profile, the processing system of the measurement apparatus determines an additional bending moment that acts on the rotor blade during operation 1030. For example, the processing system 250 of the measurement apparatus 200 of FIG. 2 may determine an additional bending moment that acts on the rotor blade 112 in response to detecting the change of the wavelength profile 520 of FIG. 5.

During operation 1040, the measurement apparatus uses an arithmetic logic unit in the processing system to determine a magnitude and an azimuth angle of the bending moment acting on the rotor shaft based on the additional bending moment that acts on the rotor blade. For example, arithmetic logic unit 645 in processing system 250 of FIG. 6 may determine a magnitude 670 and an azimuth angle 680 of the bending moment 230 of FIG. 2 acting on the rotor shaft 210 based on the additional bending moment that acts on the rotor blade 112.

If desired, the measurement apparatus may use a display to display the magnitude and the azimuth angle of the bending moment; and use an alert system to provide at least one of a visual alarm or an aural alarm in response to detecting that the magnitude of the bending moment is greater than a predetermined threshold value. For example, the measurement apparatus may use display 650 of FIG. 6 to display the magnitude 670 and the azimuth angle 680 of the bending moment 230 of FIG. 2. The measurement apparatus may further use alert system 655 of FIG. 6 to provide at least one of a visual alarm or an aural alarm in response to detecting that the magnitude 670 of the bending moment 230 of FIG. 2 is greater than a predetermined threshold value.

It should be noted that the above described embodiments are merely described to illustrate possible embodiments of the present disclosure, but not in order to restrict the present disclosure thereto. Instead, multiple modifications and variations of the above described embodiments are possible and should, therefore, also be considered as being part of the disclosure.

For instance, the measurement apparatus described above in FIG. 6 shows the display 650 and the alert system 655 as the only recipients of the magnitude 670 and the azimuth angle 680 of the bending moment. However, the storage circuit 630 may receive and store the magnitude and/or azimuth angle of the bending moment under certain predetermined conditions (e.g., whenever the magnitude and/or the azimuth angle of the bending moment acting on the rotor shaft exceeds a predetermined threshold value including the duration and timestamp, if desired). Alternatively, the alert system or any other component of the measurement apparatus may include an additional storage circuit that stores timestamps and magnitude and/or azimuth angle of the bending moment under predetermined conditions.

REFERENCE LIST

100 rotary-wing aircraft, rotorcraft, helicopter
110 multi-blade rotor
112 rotor blade
114 rotor head
115 rotor shaft
117 rotor axis
119 rotor plane
120 fuselage
123 cabin
127 rear fuselage
130 tail boom
135 horizontal stabilizer
140 counter-torque device
145 tail rotor
150 fin
170 bending moment
200 measuring apparatus
210 rotor shaft, rotor mast
212 rotor hub
215 rotational height axis
222 fiber optic cable
224 sensor arrangement
**224*a*, 224*b*, 224*c*, 224*d*** sensor
230 bending moments
235 fastener
240 pitch control cuff
245 flexbeam
250 processing system
253 upper bearing
255 lower bearing
310 strain distribution
320 force or moment
434 embedded sensor arrangement
436 surface integrated sensor arrangement
438 surface applied sensor arrangement
510 input signal
520 reflected signal
530 transmitted signal
540 fiber optic cable diameter
550 protection jacket
560 fiber core
570 fiber cladding
580 Bragg grating
620 signal
630 storage circuit
640 processing unit
645 arithmetic logic unit
650 display
655 alert system
660 retrieved data
670 bending moment magnitude
680 bending moment azimuth angle
700 diagram of bending moment in rotor blade vs. mast bending moment
800 diagram of mast bending moment vs. rotor speed
810, 820 flight test results
830 analytical results
900 diagram of theoretical bending vs. sensor measured bending
950 diagram of measurement error due to interpolation
1000 flowchart
1010, 1020, 1030, 1040 operation

What is claimed is:

1. A measurement apparatus for determining a bending moment acting on a rotor shaft of a rotary-wing aircraft, comprising:
a sensor arrangement that is mounted to a rotor blade that is attached to the rotor shaft and that comprises:
at least one sensor that generates a signal in response to a force or moment that acts on the rotor blade, and
a cable that is connected to the at least one sensor for transmitting the signal; and
a processing system that is connected to the cable and that receives the signal from the at least one sensor via the cable, wherein the processing system determines the bending moment acting on the rotor shaft based on the signal from the at least one sensor.

2. The measurement apparatus of claim 1, wherein the force or moment causes at least one of a strain, a displacement, or an angle change of the rotor blade.

3. The measurement apparatus of claim 1, wherein the sensor arrangement comprises at least one additional sensor.

4. The measurement apparatus of claim 1, wherein the sensor arrangement is an embedded sensor arrangement, a surface integrated sensor arrangement, or a surface applied sensor arrangement.

5. The measurement apparatus of claim 1, wherein the rotor blade comprises a flexbeam, and wherein the sensor arrangement is mounted to the flexbeam.

6. The measurement apparatus of claim 1, wherein the cable comprises a fiber optic cable, and wherein the at least one sensor comprise at least one optical sensor.

7. The measurement apparatus of claim 6, wherein an optical sensor of the at least one optical sensor comprises a fiber-Bragg grating in the fiber optic cable.

8. The measurement apparatus of claim 6, wherein the processing system further comprises:
an interrogator that sends light having a first wavelength profile to the at least one optical sensor, and wherein the at least one optical sensor reflects light having a second wavelength profile as the signal back to the processing system.

9. The measurement apparatus of claim 8, wherein a change of the force or moment that acts on the rotor blade causes a change of the second wavelength profile.

10. The measurement apparatus of claim 1, wherein the processing system further comprises:

a storage circuit that stores a reference signal measured during an initial undeformed state of the rotor blade; and a processing unit that retrieves the reference signal from the storage circuit to determine an additional bending moment acting on the rotor blade based on the reference signal from the storage circuit and the signal from the at least one sensor.

11. The measurement apparatus of claim 10, wherein the processing unit further comprises:

an arithmetic logic unit that determines a magnitude and an azimuth angle of the bending moment based on the additional bending moment acting on the rotor blade.

12. The measurement apparatus of claim 11, further comprising:

a display that displays the magnitude and the azimuth angle of the bending moment.

13. The measurement apparatus of claim 11, further comprising:

an alert system that provides at least one of a visual alarm or an aural alarm when the magnitude of the bending moment is greater than a predetermined threshold value.

14. A method of operating a measurement apparatus for determining a bending moment acting on a rotor shaft of a rotary-wing aircraft, the measurement apparatus comprising a processing system and a sensor arrangement, wherein the sensor arrangement is mounted to a rotor blade that is attached to the rotor shaft, and wherein the sensor arrangement further comprises at least one optical sensor and a fiber optic cable that connects the at least one optical sensor with the processing system, the method comprising:

with an interrogator in the processing system, sending light having a first wavelength profile to the at least one optical sensor, wherein the at least one optical sensor reflects light having a second wavelength profile back to the processing system;

with the processing system, detecting a change in the second wavelength profile compared to the second wavelength profile in an initial undeformed state of the rotor blade;

in response to detecting the change of the second wavelength profile, using the processing system to determine an additional bending moment that acts on the rotor blade; and using an arithmetic logic unit in the processing system to determine a magnitude and an azimuth angle of the bending moment acting on the rotor shaft based on the additional bending moment that acts on the rotor blade.

15. The method of claim 14, further comprising:

using a display to display the magnitude and the azimuth angle of the bending moment; and using an alert system to provide at least one of a visual alarm or an aural alarm in response to detecting that the magnitude of the bending moment is greater than a predetermined threshold value.

16. A rotary-wing aircraft comprising:

a rotor shaft;

a rotor blade attached to the rotor shaft;

a sensor arrangement mounted to the rotor blade, the sensor arrangement including at least one sensor and a cable connected to the at least one sensor, the at least one sensor configured to generate a signal in response to a force or moment that acts on the rotor blade;

a storage circuit configured to store a relationship between a blade bending moment acting on the rotor blade and a shaft bending moment acting on the rotor shaft; and processing circuitry connected to the cable and to the storage circuit, the processing circuitry programmed to receive the signal from the at least one sensor via the cable, determine the blade bending moment based on the signal, and determine a magnitude and an azimuth angle of the shaft bending moment by applying the relationship to the blade bending moment.

17. The rotary-wing aircraft of claim 16, wherein the relationship comprises a lookup table stored in the storage circuit, the lookup table associating values of the blade bending moment with corresponding values of the magnitude and the azimuth angle of the shaft bending moment.

18. The rotary-wing aircraft of claim 16, wherein the relationship comprises a functional relationship between the blade bending moment and the shaft bending moment, and wherein the processing circuitry applies the functional relationship to the blade bending moment to determine the magnitude and the azimuth angle of the shaft bending moment.

19. The rotary-wing aircraft of claim 16, wherein the relationship is experimentally established for a rotor including the rotor shaft and the rotor blade.

20. The rotary-wing aircraft of claim 16, wherein the relationship associates the blade bending moment and a rotor speed of a rotor including the rotor shaft and the rotor blade with the magnitude and the azimuth angle of the shaft bending moment.

* * * * *